United States Patent Office 3,136,654
Patented June 9, 1964

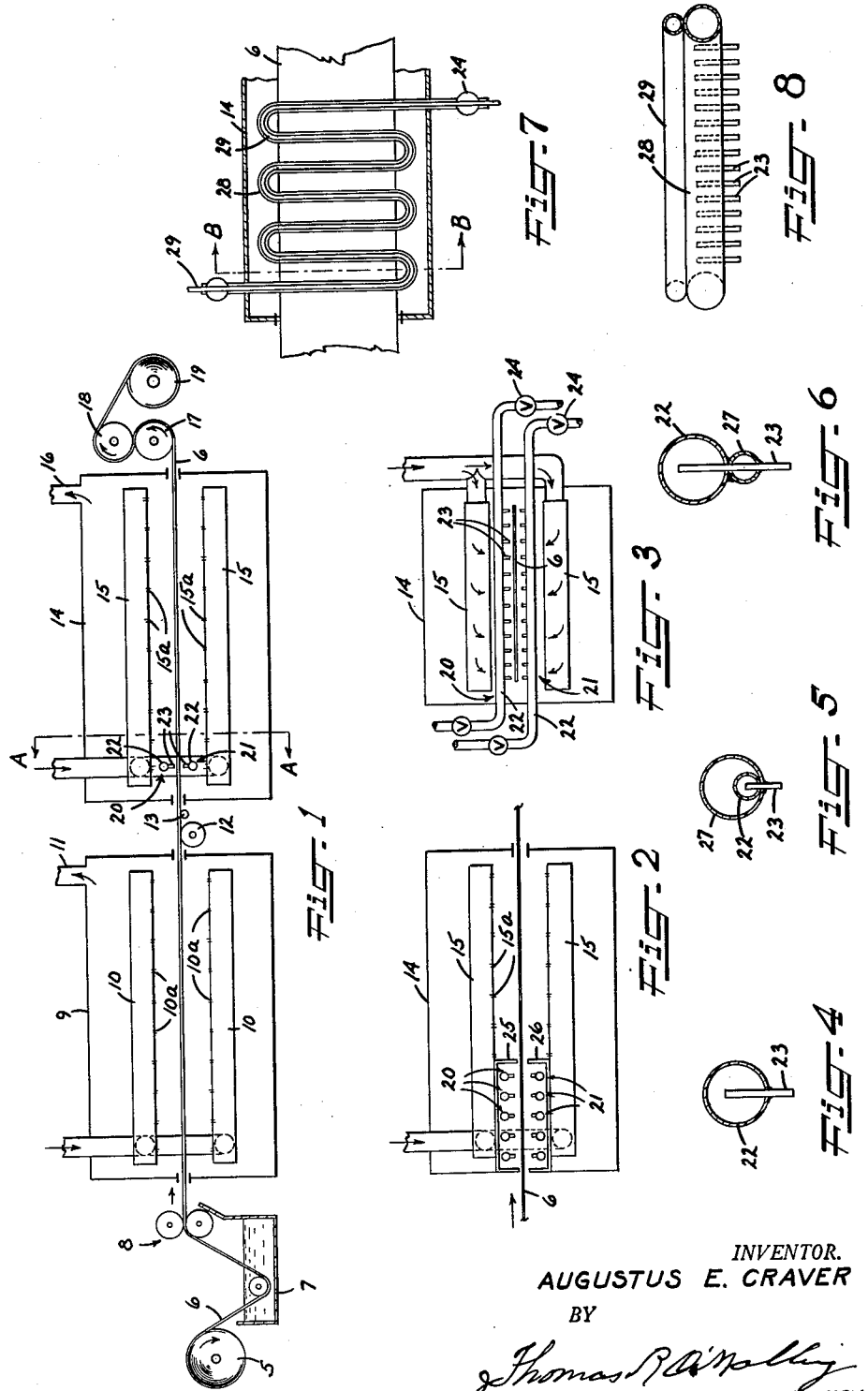
INVENTOR.
AUGUSTUS E. CRAVER

3,136,654
MANUFACTURE OF COATED MATERIAL
Augustus E. Craver, Fredericksburg, Va., assignor, by mesne assignments, to FMC Corporation, San Jose, Calif., a corporation of Delaware
Filed Nov. 18, 1958, Ser. No. 774,630
20 Claims. (Cl. 117—119.8)

This invention relates to the manufacture of coated material. More particularly the invention relates to a method of manufacturing coated sheet materials at an increased rate of speed and containing a suitable moisture content.

This application is a continuation-in-part of my application Serial No. 586,847, filed May 23, 1956, and now abandoned.

The invention pertains to the art of coating sheet materials with an organic solvent-soluble coating composition or lacquer comprising a cellulose derivative base, such as cellulose esters and ethers, for example, nitrocellulose, cellulose acetate, ethyl cellulose, benzyl cellulose, etc., or a resinous base, such as saran, polyethylene, polyvinyl chloride, vinyl acetate, vinyl chloride, copolymers of vinyl acetate and vinyl chloride, as well as polymers or copolymers of vinylidene chloride, acrylonitrile, methyl methacrylate, etc., alkyd resins, modified alkyd resins, etc., or a rubber or rubber derivative base, such as latex, rubber hydrochloride, chlorinated rubber, gutta-percha, etc., or a base of casein, agar-agar, alginates, and the like. All of these materials are film-forming polymeric substances.

The present invention is applicable to the manufacture of various types of hydrophilic coated material such as sheets, films, webs, bands, ribbons, and the like, whether they be made from fibrous or non-fibrous materials, for example, fabrics made from cotton, wool, hemp, flax, etc., or from synthetic or artificial fibers and filaments such as rayon, cellulose acetate, nitrocellulose, regenerated cellulose, ethyl cellulose, hydroxyethyl cellulose, carboxymethyl cellulose, etc., films made from viscose, cupraammonium cellulose, cellulose ethers and esters, resins, such as polyvinyl alcohol, and the like, etc. However, for the purpose of simplicity of description, the invention will be described as it is applicable to the manufacture of coated regenerated cellulose film formed from viscose, commonly known as cellophane, it being understood, of course, that this is merely intended in an illustrative sense and the invention should not be limited thereby but only insofar as the same may be limited in the appended claims.

As is generally known, cellophane is usually coated with different lacquers to impart various properties thereto such as flameproofness, moistureproofness, greaseproofness, waterproofness, heat sealability, and the like. The coating is applied to the film by immersion in the organic solvent solution of the coating compositions or by spraying the solution of lacquer on the film, or the like. The excess coating solution is removed by means of squeeze rolls, doctor blades, scrapers, etc., and the film passed through a chamber wherein the solvent is removed from the coating. The film then passes through a second chamber, or is otherwise treated, wherein it is heated and humidified to a predetermined moisture content.

In order to produce a coated film which is sufficiently pliable and salable, it is generally necessary that it contain 6.0 to 7.5% moisture, and in many instances up to 11% moisture or more. With presently employed equipment, in order to obtain the desired moisture content in the coated film, coating speeds are limited to a maximum of approximately 310 feet per minute. When the coating speed is increased beyond this maximum, a sheet having insufficient moisture content results, and in addition traces of organic solvent remain in the coating which is detrimental to the anti-blocking properties of the film as well as moistureproofness, and good performance of the film in automatic packaging and heat-sealing machines. Increasing the length, or height when coating vertically, of the coating machine, in order to obtain greater coating speed, is costly and requires a larger building.

In the manufacture of coated cellophane, by means of presently known apparatus, it is extremely difficult to obtain the proper moisture content in the finished product, namely 6.0 to 11.0%, and this is particularly true when the coating speed is increased above 310 ft./min., for example, from 700 up to 1000 ft. per min. The difficulty is caused by the fact that cellophane or regenerated cellulose film, after the removal of the major portion of the solvent from the coating which has been applied thereto by heating in the wet end of the coating machine, has an average moisture content of 1.5 to 4.0%. Therefore it is necessary to add a considerable amount of moisture to the coated cellophane while at the same time eliminating or minimizing the amount of coating solvent remaining in order to make the cellophane salable.

It is an object of the present invention to overcome the aforementioned difficulties and disadvantages and provide a method for producing coated material at a higher rate of speed.

It is another object of the invention to provide a method for producing coated materials at a high rate of speed while assuring the necessary moisture content in the finished product and the elimination of any traces of solvent in the coated material.

It is a specific object of the invention to produce coated regenerated cellulose film continuously at a rate of speed exceeding 310 ft./min. while providing a moisture content in the coated film between 6.0 and 11.0% or more.

Other objects and advantages of the present invention will be apparent from the drawing and description thereof hereinafter.

In general, the objects of the present invention are accomplished by applying an organic solvent solution to the film, removing the solvent from the coating, passing the film into a drying chamber wherein the surface of the film is impinged with a moisture-containing gas, such as steam, hot humidified air, or a fog or mist of atomized hot water, at a temperature ranging from at least 200° F. to about 212° F., and at a tremendous velocity, whereby the proper moisture content in the film is assured and any trace of solvent in the coating is removed, and then cooling the film and winding it in the form of a roll, all of said steps being performed continuously and sequentially. This procedure allows coating speeds from 700 up to about 1000 ft./min. Either one or both surfaces of the film may be impinged with steam, or the like.

In conjunction with the following detailed description of the invention, reference should be had to the accompanying drawing, which is merely intended to be illustrative and not limitative and in which:

FIGURE 1 is a diagrammatic side elevation view of coating apparatus suitable in the practice of the present invention;

FIGURE 2 is a diagrammatic side elevation view of part of the apparatus of FIGURE 1 showing a modified apparatus for applying steam to the film;

FIGURE 3 is a view taken along the line A—A of FIGURE 1;

FIGURES 4, 5 and 6 are sectional views of various type steam nozzles that may be employed in practicing the invention;

FIGURE 7 is a diagrammatic plan view of an alternative arrangement of the fluid or gas supply lines; and FIGURE 8 is a view taken along the line B—B of FIGURE 7 showing the steam nozzle.

Referring to the drawing and in particular FIGURES 1 and 3, a roll of uncoated cellophane 5 is mounted on the coating machine and the film 6 led through a bath 7 containing an organic solvent solution of a coating composition. The film is then passed through the squeeze rolls 8, which are spaced so as to give the desired thickness of coating on the film, and directed into the chamber 9 which is generally referred to as the "wet end" of the coating machine since herein the organic solvents are removed from the coating. Heated air is circulated in chamber 9 through the ducts 10 and openings 10a therein and the solvent-laden air directed to a solvent recovery system through the line or conduit 11. While the rate of solvent removal from the film coating is generally dependent upon the temperature of the air circulated thereover, the nature of the solvents and the character of the film itself, as more fully discussed hereafter, impose practical limitations on the maximum temperature of the air circulated through the chamber 9, which generally will not exceed 225° F.

The film emerging from chamber 9 passes over a spreader roller 12 and a cooling roller 13 and then enters chamber 14, which is generally referred to as the "dry end" of the coating machine since herein the film is heated and humidified. Hot humid air, as more fully discussed hereafter, is delivered to ducts 15, as shown, and discharged through openings 15a into the chamber 14 where it is circulated over the film and then leaves by means of exhaust conduit 16. The film emerging from chamber 14 passes around the driving chill rollers 17 and 18, and then the film is wound in a roll 19.

Shortly after the film 6 enters the dry end of the machine, it is impinged by a high velocity moisture-containing gas, as for example steam, as it passes between nozzles 20 and 21 which extend transversely of and as close as possible to the film. The nozzles each comprise a steam pipe or line 22 having a plurality of closely spaced pipes 23 inserted therein as shown in FIGURE 4. Petcocks 24, as shown in FIGURE 3, are provided to remove any condensate that may form in the nozzles. Preferably, pet-cocks 24 are partially open during operation in order to continuously remove the small amount of condensate which may collect in line 22.

As heretofore mentioned, one of the primary functions of impinging steam or moisture-containing gas against one or both surfaces of the film is to effect removal of the traces of solvent which remains in the film coating after its drying by hot air. The high velocity of the impinging gas creates a hot turbulent atmosphere directly adjacent to the film surfaces which facilitates the rapid evolution of the traces of solvent from the film coating. While the turbulent atmosphere formed by the impinging gas is in a hot condition, it will be noted that the traces of solvent are removed without further drying of the film, but rather is accompanied by a transfer of moisture into the film itself. When using steam (as produced by the boiling of water at 212° F.), it is in a saturated condition, and thus when striking the cooler film condenses on the surfaces thereof. While the high velocity of the steam is essential for producing a turbulence of the atmosphere adjacent the film surfaces, it serves the added purpose of actually forcing moisture into the film, thereby facilitating film humidification more rapidly than can be achieved by the conventional procedure wherein the film is merely passed through a circulating hot humid atmosphere.

To achieve the above desired effects, the moisture-containing gas is preferably at a temperature of from 200° F. to 212° F. and under a pressure of up to about 15 pounds per square inch at the time of discharge from the nozzles. The nozzle inserts or pipes 23 are spaced as close as possible to the film and preferably within a distance of from 1 to 4 inches, and are each formed with an opening of from 1/32 to about 1/8 inch. Under these conditions, the gas impinging against the film is sufficiently hot and humid to effect an evolution of the traces of solvent without causing a further drying of the film, and is moving with such a velocity as to create a turbulence of the atmosphere adjacent to the film surfaces.

Since the atmosphere within the chamber 14 is normally maintained at a temperature below 200° F., the moisture-containing gas discharged through the nozzle pipes 23 will undergo some cooling and condensation before actually impinging against the film. In view of this condition, steam discharged into the chamber 14 will immediately experience some cooling and condensation so that a fog or mist will actually be impinged against the film. If desired, steam in a slightly superheated condition (above 212° F.) may be discharged through the pipes 23, with the relatively cool atmosphere within the chamber 14 serving to chill the gas to a temperature of less than 212° F. before it strikes the film. While the temperature and/or the velocity of the moisture containing gas may be varied as described above, it will be understood that the gas temperature should not be in excess of 212° F. at the instant of impingement with the film, and that the gas velocity must be such as to create a turbulent atmosphere directly adjacent to the film surfaces.

If desired, the nozzles 20 and 21 may be placed near the exit end of the dry end of the machine or at any other location therein, but preferably they are located as shown in FIGURE 1. Alternatively, more than one nozzle may be employed above and below the film such as shown in FIGURE 2. In such an arrangement a plurality of nozzles 20 and 21 are disposed above and below the film as close thereto as possible. In some instances, it is desirable to enclose the nozzles in hoods 25 and 26 in order to avoid condensate forming on the ducts, etc., and dropping on the film.

Further, a separate chamber may be formed or constructed independently of or in the film-entrance end of the dry end of the coating machine thus separating or partitioning off the batteries of top and bottom nozzles from the dry end proper. Because of the efficient action of the nozzles in removing the last traces of organic solvent from the coating and in forcing moisture into the coated film, the separate intermediate chamber between the wet and dry ends of the coating machine may be very short, i.e., approximately eight feet in length, depending upon the desired coating speed and the solvent employed in the coating solution or lacquer. These arrangements are advantageous in that the nozzles will not interfere with or be a part of the regular humid air-circulating system normally employed in the dry end of the coating machine.

Referring to FIGURES 4, 5 and 6, there are shown various type nozzles that may be employed above and/or below the film being treated. The pipe inserts 23 extend well into the steam line in order to prevent any condensate from passing therethrough into contact with the film. In FIGURE 5, the low pressure steam line 22 is surrounded by a high pressure steam line 27 which serves to heat or preheat line 22 and prevent the formation of condensate steam. FIGURE 6 shows a variation of FIGURE 5 in which the steam preheating or booster line 27 is positioned below line 22 rather than surrounding or encasing the same.

It should be understood that FIGURES 4, 5 and 6 depict sectional views of the nozzles which may be employed on top of or above the film being treated. However, essentially the same design would be employed for the bottom nozzles with the exception that the pipe inserts 23 would not extend into line 22 or at least not to any appreciable extent or distance, in order to eliminate any possibility of condensate, which may collect in line 22, being ejected through inserts 23 onto the film. It should also be noted that when employing the embodiment shown in FIGURES 5 and 6, or in any other suitable arrangement in which the high pressure steam lines or chambers are employed for the purpose of preventing inside steam condensation in the low pressure system, the recommended steam pressures, as heretofore mentioned, range up to about 15 pounds per square inch for the low pressure steam line and from 15 to about 80 pounds per square inch for the high pressure preheating or booster line.

Depending upon the speed with which the film passes through the coating machine and the desired ultimate moisture content of the film, only one nozzle may be employed either above or below the film, or as many nozzles as desired may be employed on either or both sides of the film. The number of nozzles employed will also depend upon the particular solvents employed in the lacquers, i.e., how difficult it is to remove the last traces thereof from the coating.

The lateral spacing between nozzle inserts should be so regulated to insure that all portions of the film are impinged with the moisture-containing gas. In accordance with the preferred conditions heretofore mentioned, a lateral spacing of the nozzle inserts 23 of about 2 inches apart has been found to be satisfactory. When employing a band of nozzles, such as shown in FIGURE 2, the insert pipes 23 in one nozzle are preferably staggered with respect to the insert pipes 23 of adjacent nozzles.

If desired, an alternative arrangement of the nozzles, such as shown in FIGURES 7 and 8, may be employed above and/or below the film path. Referring to FIGURES 7 and 8, the embodiment comprises a pipe coil 28, which is preferably of 1 to 1½ inches in diameter, having pipe inserts or nozzles 23 therein, and carrying the low pressure steam as heretofore mentioned. Welded or brazed, or otherwise suitably fastened to the top of the pipe coil 28 is a pipe coil 29 which is preferably ½ or ¾ inch in diameter and carries the high pressure steam, namely 15 to 80 lbs./sq. in., and acts as a preheater for the low pressure coil 28 to prevent condensate formation therein. In lieu of a steam preheating unit, the coil 28 may be electrically preheated by an induction or resistance heater. A pet-cock 24 is employed in line 28 to remove any condensate therefrom.

It is to be understood that a slot no greater than 0.05 inch may be employed in all the embodiments herein in place of the inserts 23 and the steam or other vapor carrying pipes may have any desired cross section; for example, they may have a square cross section or rectangular and be constructed of sheet metal or square tubing, and the like.

While the above description has made reference to discharging steam or slightly superheated steam into the chamber 14, it will of course be understood that other moisture-containing gases, as for example, hot humidified air (mixture of air and steam at a temperature of about 200–212° F. and close to 100% saturation) may be used with equally satisfactory results. A modified apparatus, particularly suited for use with hot humidified air, may be formed by eliminating the nozzles and employing a circulating unit comprising a chamber similar to the combination of hoods 25 and 26 which in themselves, in the embodiment of FIGURE 2, may be a single chamber having slots in the end-walls thereof for the passage of the film therethrough. Humidified air may be delivered into the chamber (formed as for example by hoods 25 and 26) through slots which correspond to the nozzles described above and impinged against the film. As in the case of steam described above, the humidified air is preferably at a temperature of from 200° F. to not greater than 212° F. and a relative humidity which approaches 100% as it is delivered through the discharge slots. The slots are of a width not greater than 0.05 inch and are placed as close as possible to the film, and preferably within 1 to 4 inches as with the nozzles heretofore described. The humidified air, at the time of delivery, preferably has a linear velocity of from 3000 to 5000 feet/min. so that it creates the desired turbulent atmosphere adjacent the film surfaces. The humidified air, as in the case of steam, will undergo some cooling and condensation as it leaves the delivery slots and will therefore be in the form of a gaseous moisture-containing medium or fog at the time of impingement with the film. In accordance with the above preferred conditions, it has been found that subjecting cellophane to humidified air having a relative humidity of about 97% and a temperature of about 208° F. (practically saturated and almost at the boiling point of water) at the time of delivery provided highly satisfactory results since, at this extreme temperature, the cellophane loses its moistureproof properties and takes up moisture at a rapid rate.

After being impinged by the high velocity steam, fog or hot humidified air, the film passes through an atmosphere of circulating hot humid air supplied by the conduits 15. This hot humid air is at a temperature of from 160° F. to not greater than 212° F. and serves to adjust the moisture content of the film to a desired value. It will be noted that this hot humid air supplied by the conduits 15 need not be delivered with a high velocity and is not impinged directly against the film, but is merely circulated thereover so as to provide a humid atmosphere through which the film travels.

Cellophane weighing 30 grams per square meter was coated on a coating machine such as described above without the steam nozzles. A speed of 310 ft./min. was the top coating speed possible and the film contained a maximum of 6.0% moisture. When heat-sealed to form bags, the film tore when the bags were opened because of lack of toughness apparently caused by insufficient moisture content. A trace of solvent remained in the coating which was detrimental to the moistureproof value of the film and induced blocking of the film when sheets were stacked under pressure at 115° F. It is possible to raise the moisture content of the film to 6.5 to 7.5% at a coating speed of 310 ft./min. by raising the wet-bulb temperature of the dry end to 154 to 155° F. with the dry-bulb temperature of 160° F. However, the small temperature difference 160°/155° F. is very difficult to maintain and in cold weather condensation occurs in the chamber which drips on the film causing it to pucker and detrimentally marking the same, particularly when coatings are resinous and not completely hardened.

However, when cellophane weighing 30 grams per square meter was coated in accordance with the present invention, i.e., impinging it with steam at high velocity after practically all the solvent has been removed from the coating, not only was the last trace of solvent removed but no detrimental effect on moisture-proofness or anti-blocking properties was detected. In addition, the sealed bags did not tear when opened because the film contained 7.8 to 8.2% moisture. Further, it was found that the coating speed could be increased to about 700 to 1000 ft./min. without any detrimental effect on the moisture content of the film and other properties, such as heat-sealing, moistureproofness, and anti-blocking. The same was true for various other weights of cellophane presently produced and sold.

Preferably low boiling solvents are employed in the lacquers. However, in many cases, it is necessary to use high boiling butyl acetate or other high boiling solvents such as xylene or methyl isobutyl ketone in the lacquers due to the solubility of various ingredients therein. The last traces of butyl acetate, xylene and methyl isobutyl ketone are difficult to remove from the film, and due to explosive qualities of organic solvents the wet end temperature cannot be raised any higher than about 225° F. to increase solvent removal. With the present invention, coating speeds as high as 700 to 1000 ft./min. can be attained when employing lacquers or coating solutions containing 5 to 15% butyl acetate in addition to other solvents while still maintaining a moisture content in the finished film of 6.0 to 11.0% or more.

One of the important advantages of this invention is that both the wet and dry ends or chambers of the coating machine may be greatly reduced in length, up to 30 to 40%, and still obtain a coated film entirely free of solvent and with a desired moisture content of 6.0 to 11.0%. Numerous other advantages follow from this reduction in length of the wet and dry ends of the coating machine, among a few of which are:

(1) A considerable saving in cost of building and housing the coating machines;

(2) Material reduction of troublesome flutter of the film, particulary cellophane, in the coating machine due to loose or "floppy" edges and bands in the film formed by thick and thin places therein;

(3) Reduction of film breakage and consequent loss of production time and film because of less weight of film to be supported between the ends of the coating machine;

(4) The production of a superior grade of coated film because of higher moisture content therein and the elimination of the last traces of solvent from the coating or coatings thereon; and (5) The permissible use of higher boiling lacquer solvents at high coating speeds with a resultant higher quality lacquer coating on the film.

Numerous other advantages of the present invention will be apparent to those skilled in the art.

It should be understood that various changes may be made in the coating apparatus employed in practicing the present invention and changes and variations may be made in the process without departing from the spirit and scope of the invention as defined in the appended claims.

I claim:

1. A method for continuously coating a web material comprising continuously passing the material through a solution of an organic solvent-soluble coating composition dissolved in a volatile organic solvent, continuously passing the material through a path, evaporating substantially all of the solvent from the coating as the material passes along a portion of the path by circulating heated air over the material, removing the last traces of solvent from the coating and forcing moisture into the material by impinging the surface of the material with a moisture-containing gas as the material enters a second portion of the path, said moisture-containing gas being delivered at a high velocity to create a turbulent atmosphere adjacent to the surface of the material and at a temperature of not greater than about 212° F., adjusting the moisture content of the material to a predetermined value during the remainder of the second portion of the path by passing the same through an atmosphere of humid air having a temperature of not greater than 212° F., and cooling the material.

2. A method as defined in claim 1 wherein said moisture-containing gas is at a temperature of from about 200° F. to about 212° F.

3. A method as defined in claim 1 wherein said moisture-containing gas is in the form of saturated steam.

4. A method as defined in claim 1 wherein the moisture-containing gas is humidified air having a temperature of from about 200° F. to about 212° F.

5. A method as defined in claim 1 wherein the atmosphere of humid air is at a temperature ranging from about 160° F. to about 212° F.

6. A method for continuously coating a non-fibrous sheet of organic material comprising continuously passing the material through a solution of an organic solvent-soluble coating composition comprising a film-forming polymeric substance dissolved in a volatile organic solvent, removing the excess of the coating composition and then continuously passing the coated material through a path, evaporating substantially all of the solvent from the coating as it passes along a portion of the path by circulating heated air over the material, removing the last traces of solvent from the coating and forcing moisture into the material with a moisture-containing gas as the material enters a second portion of the path, said moisture-containing gas being delivered at a high velocity to create a turbulent atmosphere adjacent to the surface of the material and at a temperature of from 200° F. to about 212° F., adjusting the moisture content of the material to a predetermined value of from 6 to 11% during the remainder of the second portion of the path by passing the same through an atmosphere of humid air having a temperature of from 160° F. to 212° F., and cooling the material.

7. A method for continuously coating a non-fibrous cellulosic sheet material comprising continuously passing the material through a solution of an organic solvent-soluble coating composition comprising a film-forming polymeric substance dissolved in a volatile organic solvent comprising a high boiling solvent, then continuously passing the coated material through a path, evaporating substantially all of the solvent from the coating as it passes along a portion of the path by circulating heated air at a temperature of not over 225° F. over the material, removing the last traces of solvent from the coating and forcing moisture into the material by impinging the surface of the material with a moisture-containing gas as the material enters a second portion of the path, said moisture-containing gas being delivered at a high velocity to create a turbulent atmosphere adjacent to the surface of the material and at a temperature of not greater than about 212° F., adjusting the moisture content of the material to a predetermined value during the remainder of the second portion of the path by passing the same through an atmosphere of humid air having a temperature of not greater than 212° F., and cooling the material.

8. A method as defined in claim 7 in which the sheet material is of regenerated cellulose.

9. A method as defined in claim 7 in which the sheet material is of regenerated cellulose, and it is passed through the solution and the subsequent path at a speed above 310 feet per minute.

10. A method as defined in claim 7 in which the sheet material is of regenerated cellulose, and it is passed through the solution and the subsequent path at a speed above 310 feet per minute, and wherein the moisture-containing gas is steam.

11. A method as defined in claim 7 in which the sheet material is of regenerated cellulose, and is passed through the solution and the subsequent path at a speed above 310 feet per minute, and wherein the moisture-containing gas is humidified air having a temperature of from about 200° F. to 212° F.

12. A method for continuously coating a non-fibrous hydrophilic cellulosic sheet material comprising continuously passing the material through a solution of an organic solvent-soluble coating composition comprising a cellulose derivative dissolved in a volatile organic solvent comprising a high boiling solvent, then continuously passing the coated material through a path, evaporating substantially all of the solvent from the coating as it passes along a portion of the path by circulating heated air at a temperature of not over 225° F. over the material, removing the last traces of solvent from the coating and forcing moisture into the material by impinging the surface of the material with a moisture-containing gas as the material enters a second portion of the path, said moisture-containing gas being delivered at a high velocity to create a turbulent atmosphere adjacent to the surface of the material and at a temperature of from 200° F. to about 212° F., adjusting the moisture content of the material to a predetermined value of from 6 to 11% during the remainder of the second portion of the path by passing the same through an atmosphere of humid air having a temperature of from 160° F. to 212° F., and cooling the material.

13. A method as defined in claim 12 in which the sheet material is cellophane, the moisture-containing gas is steam, and hot humid air is at a temperature of from about 160° F. to 212° F.

14. A method as defined in claim 12 wherein the moisture-containing gas is humidified air having a linear velocity in the range of 3000 to 5000 feet per minute.

15. A method as defined in claim 12 in which the sheet passes through the solution and the path at a rate above 310 feet per minute up to 500 feet per minute.

16. A method as defined in claim 12 in which the high boiling solvent is butyl acetate and the cellulose derivative is nitrocellulose.

17. A method for continuously coating a regenerated cellulose sheet material comprising continuously passing the material through a solution of an organic solvent-soluble coating composition comprising a linear polymeric synthetic resin dissolved in a volatile organic solvent comprising a high boiling solvent, then continuously passing the coated material through a path, evaporating substantially all of the solvent from the coating as it passes along a portion of the path by circulating heated air at a temperature of not over 225° F. over the material, removing the last traces of solvent from the coating and forcing moisture into the material by impinging the surface of the material with a moisture-containing gas as the material enters a second portion of the path, said moisture-containing gas being delivered at a high velocity to create a turbulent atmosphere adjacent to the surface of the material and at a temperature of from 200° F. to about 212° F., adjusting the moisture content of the material to a predetermined value of from 6 to 11% during the remainder of the second portion of the path by passing the same through an atmosphere of humid air having a temperature of from 160° F. to 212° F., and cooling the material.

18. A method for continuously coating a regenerated cellulose sheet material comprising continuously passing the material through a solution of an organic solvent-soluble coating composition comprising a saran dissolved in a volatile organic solvent comprising a high boiling solvent, then continuously passing the coated material through a path, evaporating substantially all of the solvent from the coating as it passes along a portion of the path by circulating heated air at a temperature of not over 225° F. over the material, removing the last traces of solvent from the coating and forcing moisture into the material by impinging the surface of the material with a moisture-containing gas as the material enters a second portion of the path, said moisture-containing gas being delivered at a high velocity to create a turbulent atmosphere adjacent to the surface of the material and at a temperature of from 200° F. to about 212° F., adjusting the moisture content of the material to a predetermined value of from 6 to 11% during the remainder of the second portion of the path by passing the same through an atmosphere of humid air having a temperature of from 160° F. to 212° F., and cooling the material.

19. A method as defined in claim 18 in which the sheet passes through the solution and the path at a rate above 310 feet per minute up to about 1000 feet per minute, and wherein said moisture-containing gas is saturated steam.

20. A method as defined in claim 18 in which the moisture-containing gas is hot humidified air which is directed toward the material at a velocity of from 3000 to 5000 feet per minute.

References Cited in the file of this patent

UNITED STATES PATENTS

| | | |
|---|---|---|
| 1,826,698 | Charch et al. | Oct. 6, 1931 |
| 2,431,738 | Drew | Dec. 2, 1947 |
| 2,438,366 | Illingworth | Mar. 23, 1948 |
| 2,590,849 | Dungler | Apr. 1, 1952 |
| 2,859,136 | Marsh et al. | Nov. 4, 1958 |

FOREIGN PATENTS

| | | |
|---|---|---|
| 946,164 | France | May 25, 1949 |
| 959,286 | France | Mar. 27, 1950 |